Figure 1:
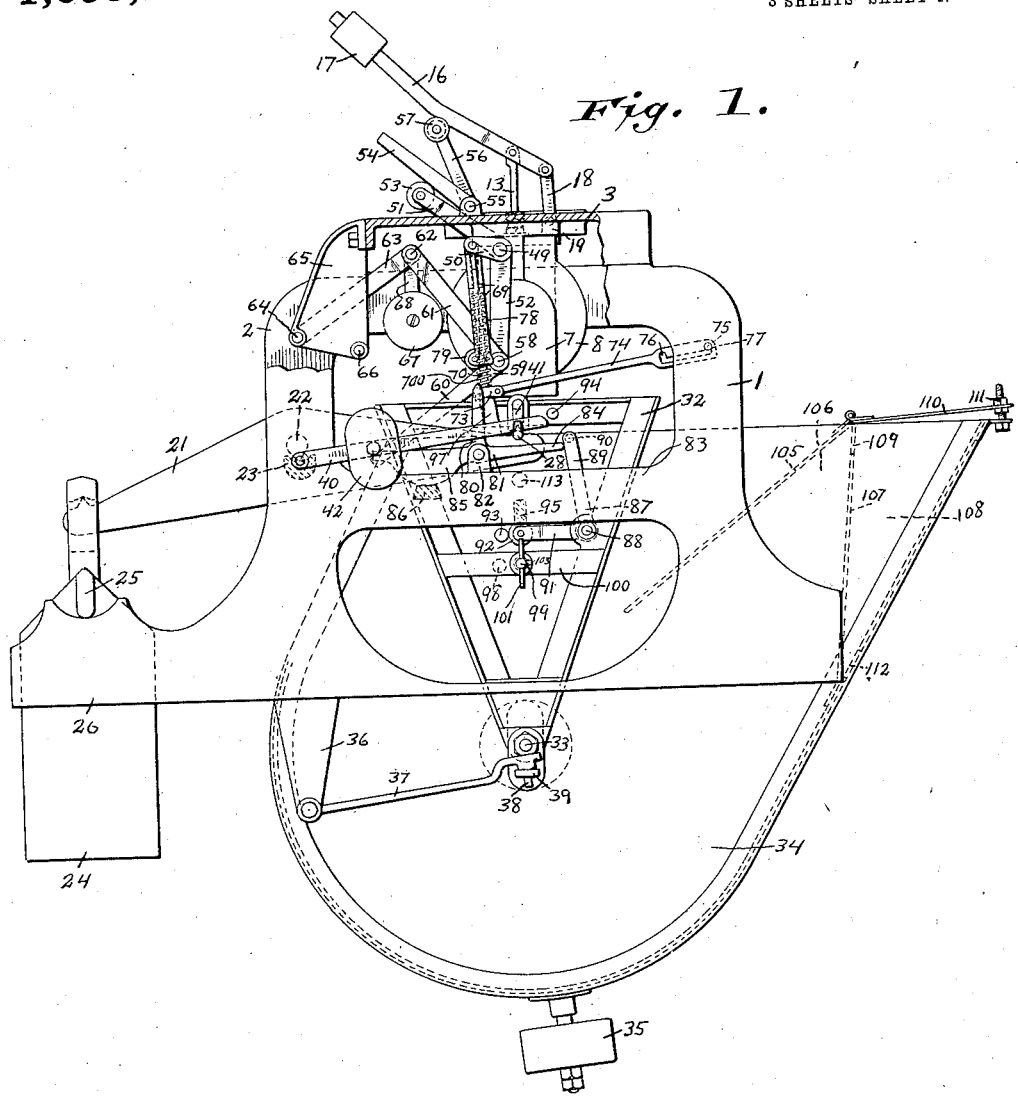

H. W. WELSH.
APPARATUS FOR WEIGHING LIQUIDS.
APPLICATION FILED AUG. 28, 1911.

1,099,223.

Patented June 9, 1914.
3 SHEETS—SHEET 1.

Witnesses:
Fred Palm
Frank E. Dennett

Inventor:
Henry William Welsh
By Flanders Bottum Fawsett & Bottum
Attorneys.

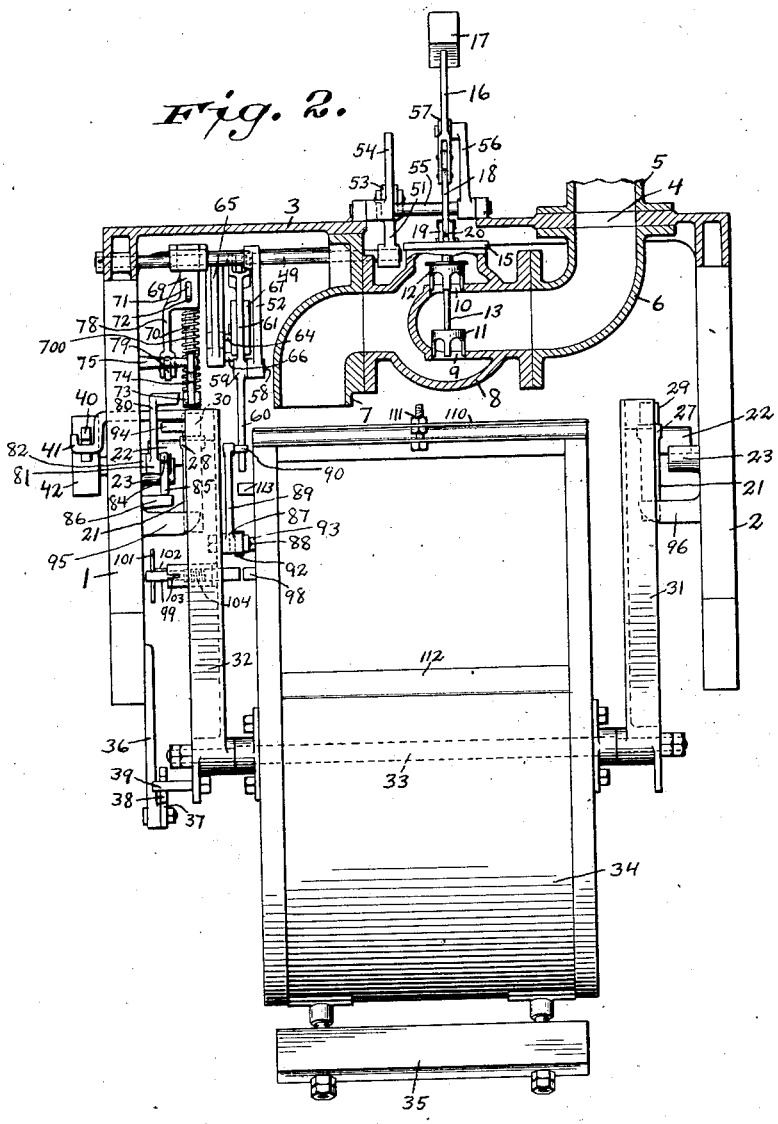

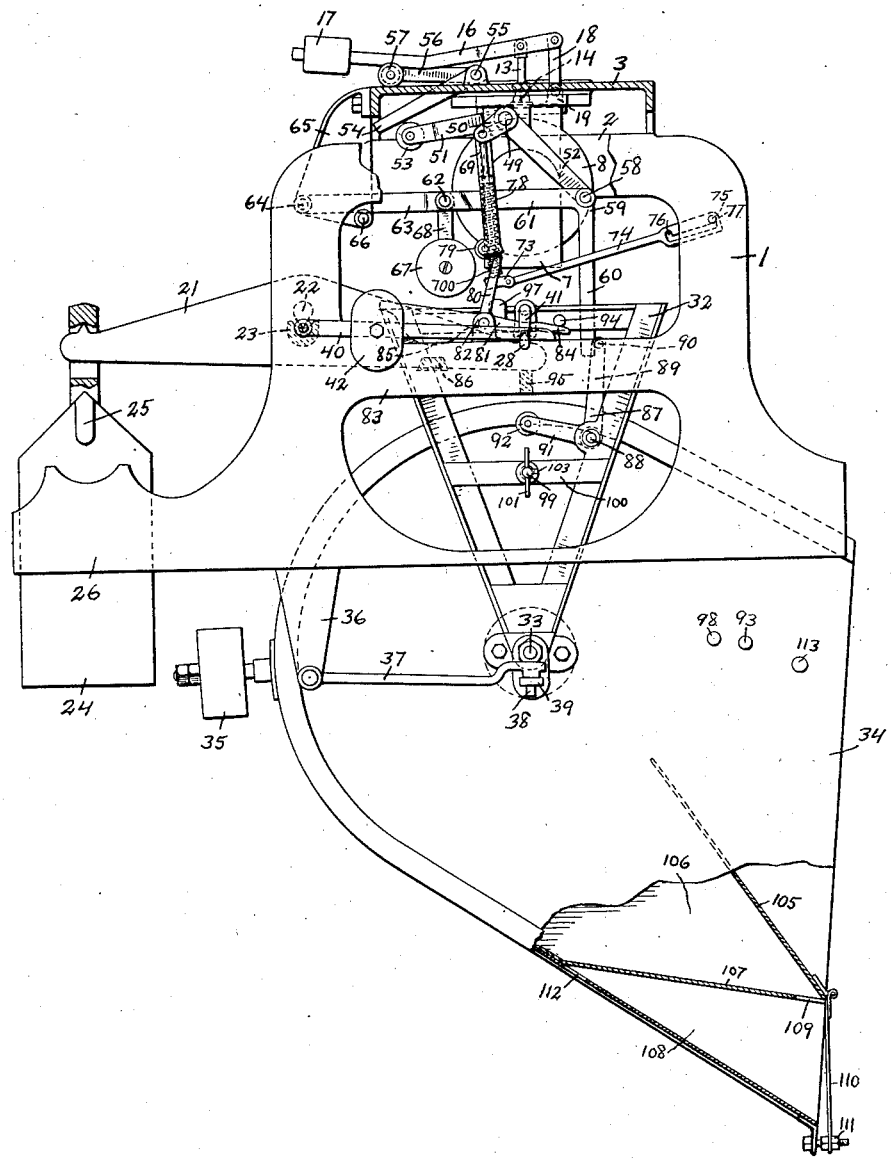

UNITED STATES PATENT OFFICE.

HENRY WILLIAM WELSH, OF NORTH MILWAUKEE, WISCONSIN, ASSIGNOR TO THE AVERY SCALE COMPANY, OF NORTH MILWAUKEE, WISCONSIN, A CORPORATION OF WISCONSIN.

APPARATUS FOR WEIGHING LIQUIDS.

1,099,223. Specification of Letters Patent. Patented June 9, 1914.

Application filed August 28, 1911. Serial No. 646,358.

*To all whom it may concern:*

Be it known that I, HENRY WILLIAM WELSH, a subject of the King of Great Britain, residing at North Milwaukee, in the county of Milwaukee and State of Wisconsin, have invented certain new and useful Improvements in Apparatus for Weighing Liquids, of which the following is a specification, reference being had to the accompanying drawing, forming a part thereof.

This invention relates to apparatus for weighing liquids and the objects of the invention are to provide weighing apparatus for liquids which will automatically weigh and deliver separate charges or volumes of a liquid in succession, each separate charge or volume weighing a selected, predetermined weight, and further objects of the invention are to provide special features of construction for such apparatus in the manner to be hereinafter described and claimed.

Referring to the drawings which accompany this specification and form a part thereof, which drawings illustrate an embodiment of this invention, and on which drawings the same reference characters are used to designate the same elements wherever they may appear in each of the several views, Figure 1 is a side elevation of the apparatus, parts being broken away and parts being shown in section, the movable parts being shown in the receiving or charging positions; Fig. 2 is an end elevation, the weight box being omitted and parts being broken away and parts being shown in section, the movable parts being shown in the receiving or charging positions; and Fig. 3 is a side elevation, parts being broken away and parts being shown in section, the movable parts being shown in the discharging or delivering positions.

Referring specifically to the drawings, the reference numerals 1 and 2 designate the fixed side frames of the apparatus which may be supported in any suitable way, and 3 the top which unites the side frames. The top is provided with an aperture 4 to receive the liquid which may be conducted thereto by a pipe 5. A pipe elbow 6 is secured below the top 3 in alinement with the aperture 4 and a pipe elbow mouthpiece 7 is also secured below the top 3. Between the pipe elbows 6 and 7 is secured the valve casing 8 provided with the valve ports 9 and 10, the thoroughfares through which are controlled by the valve plugs 11 and 12 carried by the valve stem 13. The valve stem 13 projects through a stuffing box 14 on the cap 15 and is pivotally connected with the operating lever 16. The operating lever 16 is provided with the weight 17 at one end to close the valve, (the word "valve" will be used hereafter to designate collectively the valve plugs 11 and 12) and is pivoted to the link 18 at its opposite end, the said link 18 being pivotally secured to lugs 19 and 20 extending upwardly from the cap 15 of the valve casing.

The scale beams 21 are supported by knife edges 22 upon V-lugs 23 extending inwardly from the side frames 1 and 2 and suspended from the outer ends of the scale beams 21 is the weight box 24 which is provided with lugs 25 adapted to seat upon projections 26 extending from the side frames 1 and 2 to limit the downward movement of the weight box and the outer ends of the scale beams 21. The inner ends of the scale beams 21 are provided with knife edges 27 and 28 on which V-bearings 29 and 30 are supported. The V-bearings 29 and 30 are secured to and support the triangular shaped hopper supporting frames 31 and 32 which are united at their lower ends by the shaft 33 which extends liquid tight through the hopper 34 and upon which shaft the hopper 34 is adapted to tilt into the positions shown by Figs. 1 and 2 of the drawings to receive the charge of liquid to be weighed and into the position shown by Fig. 3 of the drawings to discharge the weighed charge of liquid. The counterbalance weight 35 is secured to the lower part of the hopper 34 to tilt the hopper back into the charging position from the discharging position when the liquid has run out from the hopper. A bracket 36 depends from the side frame 1 and a rod 37 is pivoted to said bracket in the vertical line passing through the knife edge 22, and rod 37 is provided with a pin 38 which can be slipped into an aperture in a lug 39 secured to the lower part of the triangular frame 32, the said pin 38 and the aperture in lug 39 being in the same vertical line as the knife edge bearing 28, the rod 37 thus forming a parallel motion device so that while triangular frames 31 and 32 are free to move up and down with the oscillations of scale beams 21, the said triangular frames 31 and 32 are prevented from tipping from their vertical position.

The reference numeral 40 designates an overbalancing lever which is pivotally supported at one end upon the frame 1 at a point in line with the edge of knife edge bearing 22 and has its other end supported by the hook 41 which is rigidly secured to triangular frame 32. A weight 42 is secured at any selected point upon the lever 40, by a set screw or other means, to overbalance the hopper 34 and the liquid contained therein by a selected, predetermined weight to substantially equal the weight of the column of liquid from the mouthpiece 7 and the striking energy of said falling column.

The reference numeral 49 designates a shaft which is disposed transversely with respect to the apparatus, and to shaft 49 are immovably secured the crank 50 and lever arms 51 and 52. The lever arm 51 is provided with an antifriction roller 53 at its end which lies under and contacts with the lever 54 which is immovably secured to a rock shaft 55, and rock shaft 55 has immovably secured thereto a lever 56 provided at its outer end with an antifriction roller 57 which is grooved and upon which the lever arm 16 pivoted to the valve stem 13 rests. The arm 52 is pivoted at its outer end by a pivot 58 to the bend of a bell crank lever which is designated generally by the reference character 59, the two arms thereof being designated by the reference characters 60 and 61. The arm 61 is pivoted at its end by a pivot 62 to one end of a link 63 which is pivoted at its opposite end to a pivot 64 supported by a bracket 65 depending from the top 3 of the frame. The bracket 65 is provided with a stop pin 66 against which link 63 rests when in its lowermost position, the construction being such that when link 63 is in its lowermost position the pivots 64, 62 and 58 lie in a straight line, whereby the valve opening parts are held locked in position until the pivot 62 is elevated. In order to pull link 63 and arm 61 down into the horizontal position with link 63 resting against stop pin 66 the weight 67 is supported by the strap 68 from pivot 62 upon which pivot the weight 67 freely hangs. A pendant 69 depends from crank 50. The said pendant 69 is provided with a longitudinal bore within which is received the depending rod 70 which rod is movable longitudinally within said bore, the extent of its longitudinal movement being limited by the slot 71 in the pendant and the pin 72 secured to said rod. The rod 70 is provided with a head 73, the lower part of which is curved as clearly shown by the drawings, and a link 74 is pivoted to the head 73 and is retained in positions of adjustment by the pin 75 secured to frame 1 which may be engaged with either of the slots 76 or 77 in the end of said link 74. The purpose of link 74 is to prevent the pendant 69 and the rod 70 from swinging about the pivotal connection of the pendant with the crank arm 50. A spring 700 surrounds rod 70 and is compressible between the head 73 and the pendant 69. The pendant 69 is provided with the offset, downwardly projecting arm 78 which is provided with the antifriction roller 79 at its lower end. The antifriction roller 79 is adapted to seat on the top of the V-shaped lug on the upwardly projecting arm 80 of the dribble trip 81. The dribble trip 81 is pivoted to lug 82 which is supported by the cross member 83 of the frame 1 and is in structure a form of bell crank lever provided with the upwardly projecting arm 80, the horizontally projecting arm 84 and the counterbalance weight 85 which is adapted to rest upon the lug 86 projecting inwardly from the horizontal member 83 of the side frame 1.

The reference numeral 87 designates a bell crank lever pivoted at its angle by pivot 88 to the triangular frame 32. This bell crank lever 87 is provided with an upwardly projecting arm 89 which inclines inwardly from the vertical when the parts are in the position shown by Fig. 1 of the drawings, and a pin 90 projects inwardly from the upper end of the arm 89 into the path of movement of the arm 60 for the purpose to be presently described. The other arm 91 of bell crank lever 87 is provided with an antifriction roller 92.

A pin 93 projects from the hopper 34 and bears against the antifriction roller 92 to prevent the hopper 34 from tipping and discharging liquid therein until the proper time. The pin 93, antifriction roller 92 and pivot 88 of the bell crank lever 87 all lie in a straight line when the apparatus is in the filling position, so that there is no tendency for the hopper 34 to rotate bell crank lever 87 because of the pressure of the pin 93 against the antifriction roller 92. The bell crank lever 87 can be swung so as to lift the antifriction roller 92 from between pin 93 and pivot 88, thereby permitting the hopper to tip in a manner to be hereinafter described, but the arrangement of the arms 89 and 91 of bell crank lever 87 is such as to bring the center of gravity of said bell crank lever to the left of pivot 88, Fig. 1, and pivot 88 is so arranged that a stop is provided to limit the downward movement of the arm 91 to the position shown by Fig. 1 of the drawings.

A pin 94 projects from the top cross member of triangular frame 32 so that when the said frame member 32 moves downwardly the pin 94 will contact with the arm 84 of the dribble trip. The side frames 1 and 2 are provided with the stop lugs 95 and 96 respectively, to limit the downward movement of the scale beams 21 and the frames 31 and 32 and hopper 34 carried thereby. One of the scale beams 21 is provided with an upstanding lug 97 the upper end of which is curved to correspond with the curvature of the head 73 on the rod 70.

The hopper 34 is provided with a pin 98 projecting therefrom and in a horizontal line with said pin 98 is a pin 99 supported by the cross member 100 of the triangular frame 32. The two pins 98 and 99 are quite close together and their purpose is to enable the balance of the apparatus to be ascertained. The pin 99 may be provided with a hand grasp 101 and is normally out of alinement with pin 98, but by turning said pin by the hand grasp 101 to bring the feather 102 into alinement with slot 103 the spring 104 will force the pin 99 inwardly so as to bring it in horizontal alinement with pin 98, and when pins 98 and 99 are in horizontal alinement the balance of the apparatus may be tested by permitting the hopper 34 to move down, because the hopper 34 cannot tip over on account of pin 98 coming in contact with pin 99. The hopper 34 is so shaped that its center of gravity lies to the right of shaft 33 (see Fig. 1 of the drawings) so that it will tip over to the right and downwardly to discharge the liquid contained therein when bell crank lever 87 is swung so as to release the antifriction roller 92 from the pin 93.

In order to hold the hopper in its discharge position until the liquid therein has run out therefrom and to overcome the tendency of the counterbalance weight 35 to tip the hopper back to the upright position, a partition 105 is provided in the interior of the hopper which extends from side to side of the hopper to form a chamber 106 to retain a part of the liquid in the hopper to overbalance the counterbalance weight 35 until the liquid in the hopper has been substantially entirely discharged. A second partition 107 is preferably provided, whereby a separate chamber 108 is formed which is in communication with chamber 106 through an aperture 109 in partition 107, and it will be readily seen from an inspection of Fig. 3 of the drawings that when the hopper tilts to its discharge position, the chambers 106 and 108 will immediately be filled with liquid. In order that the liquid in chambers 106 and 108 may escape, the hinged cover 110 is provided for chamber 108 and adjusting means 111 are provided by means of which the extent of opening of the cover 110 may be fixed so that the rate of discharge of the fluid from chambers 106 and 108 can be properly proportioned to the rate of discharge of the liquid from the hopper. At the point where partition 107 joins the wall of the hopper, an aperture 112 is provided, so that the small quantity of liquid, which may not escape from chamber 108 before the hopper begins to tilt back to the upright position under the influence of counterbalance weight 35, can escape. The hopper 34 is provided with the pin 113, which projects from the hopper so as to contact with the arm 60 of bell crank lever 59, as the hopper swings upwardly, and swing the arm 60 to the left (see Figs. 1 and 3) whereby the pivot 62 will be elevated.

The operation of the apparatus is as follows: The selected weights for the successive charges of liquid to be weighed are placed in the weight box 24 and liquid is then admitted into pipe 5, from which, with the parts of the apparatus in the positions shown by Figs. 1 and 2 of the drawings, it will flow through the valve and mouth piece 7 into the hopper. During this operation the valve is wide open and the liquid flows under full head into the hopper 34. The weight 42 has been adjusted on lever 40 to provide an overbalance for the hopper 34 to account for the weight of the column of liquid in suspension between the mouth-piece 7 and the liquid in hopper 34, and also for the effect of the energy or striking force of the said column upon the hopper. The hopper is pressed downwardly by the liquid which accumulates therein and the column of liquid which is flowing thereinto and also by weight 42 and the combined weights or downwardly acting forces of weight 67, link 63, bell crank lever 59, pendant 69, crank 50, levers 51, 54, 56, 16 and weight 17. When enough fluid has accumulated in the hopper 34 to make up weight enough in connection with the weights heretofore mentioned tending to force the hopper 34 downwardly by overbalancing the weight box 24 and weights therein, the hopper 34 and the supporting frames 31 and 32 therefor will move downwardly and elevate the weight box 24.

When the hopper 34 and the supporting frames therefor, 31 and 32, move downwardly the following action takes place: Spring 700 forces rod 70 with its head 73 down, keeping the head 73 in contact with the projection 97 on scale beam 21, and keeping the crank 50 elevated and the valve wide open during the first part of this descent of the hopper 34 and its supporting frames 31 and 32. When spring 700 has expanded so that the force of its compression is not sufficient to hold up the crank 50 and the weights of the various parts tending to force the end of said crank 50 down, said parts force down the end of crank 50 and pendant 69 and antifriction roller 79. The hopper 34 and frames 31 and 32 are moving downwardly during this time. Weight 67 moves down bringing link 63 and arm 61 of bell crank lever 59 toward a horizontal position, the levers 51, 54, 56 and 16 move down, the weight 17 partly closing the valve. If this downward movement of these several parts were permitted to continue the valve would be entirely closed, but as hereinbefore stated, a dribble is provided to make accurate the exact weight of each charge of the liquid. The dribble stop is provided for this purpose and as the parts hereinbefore referred to move downwardly, the antifriction roller 79 comes in contact with the V-shaped edge of the upstanding projection 80 of the dribble stop and prevents farther downward movement of the pendant and the parts tending to force the pendant down. This action results in taking off a part of the weight which is overbalancing weight box 24 and the weights therein and moving the hopper 34 downwardly and the consequence is that the hopper comes to rest with the valve slightly open to permit liquid to dribble into the hopper to complete the weight of the charge. When sufficient additional liquid from the dribble has entered the hopper to again cause the hopper to move downwardly, the pin 94 strikes the arm 84 of the dribble trip, forcing said arm 84 downwardly and swinging the upstanding arm 80 out from under the antifriction roller 79 and the weights 67 and 17 together with the weights of the several links and levers immediately close the valve, shutting off the flow of the liquid entirely and suddenly. The weight 67 pulls the link 63 and the arm 61 of the bell crank lever 59 down into a horizontal position, with the link 63 resting against the stop 66, and swings the arm 60 of the bell crank lever 59 to the right, Fig. 1, so that during its movement it strikes the pin 90 of the bell crank lever 87, swinging said bell crank lever so that the antifriction roller 92 is elevated above pin 93 and the hopper 34 tips over and discharges its contents, the tendency of the triangular frames 31 and 32 to swing being prevented by the link 37, as hereinbefore explained. The liquid which collects in chambers 106 and 108 keeps the hopper 34 tilted over until the liquid has practically completely drained out therefrom, and then under the influence of the counterbalance weight 35 the hopper tilts back to its charging position, and what little liquid now remains in chamber 108 runs out through the aperture 112. As the hopper is tipped back to the filling position by the counterbalance weight 35 the pin 113 strikes against the arm 60 of bell crank lever 59 thereby elevating pivot 62 and breaking the lock which was formed by link 63 and the arm 61 of bell crank lever 59 being in the same straight line, as hereinbefore explained. Meanwhile the weight box 24 with the weights therein has been descending and the hopper and the supporting frames 31 and 32 therefor have been ascending. The upstanding projection 97 on the scale beam 21 contacts with the head 73 on the rod 70 and compresses spring 700 and when spring 700 has been compressed sufficiently the pendant 69 is elevated, swinging crank 50 upwardly, rotating shaft 49, elevating lever 51 and swinging bell crank lever 59 bodily to the left (see Fig. 1) by the lever 52. As the lever 51 is elevated it elevates lever 54 and rocks shaft 55, thereby elevating lever 56, which in turn elevates lever 16, thereby fully opening the valve and permitting the liquid to enter the hopper at full head. The counterbalance weight 85 of the dribble trip has meanwhile fallen against the lug 86 as soon as the antifriction roller 79 was elevated above the upper end of the upstanding arm 80 and the pin 93 has passed up under and to the left of the arm 91 of bell crank lever 87 and the arm 91 has fallen so that the pin 93 rests against the anti-friction roller 92 and holds the hopper 34 locked against tipping.

The operations already described are repeated with each successive weighed charge for the number of successive charges which it is desired to weigh.

What is claimed is:

1. The combination in apparatus for weighing liquids of a frame, a scale beam supported by knife edges on said frame and supporting at one end a hopper to receive the liquid to be weighed and at its other end the weight receiving apparatus, a valve to supply liquid to said hopper, a weight to close said valve and adapted to be lifted by the upward movement of the hopper when it is overbalanced by the weights at the other end of the scale beam, a lever pivoted to said frame in vertical line with said knife edges and having its movable end supported by the hopper end of the scale beam, and an adjustable overbalancing weight supported by said lever.

2. The combination in apparatus for weighing liquids of a frame, a scale beam supported by said frame between its ends and supporting at one end a hopper to receive the liquid to be weighed and at its other end the weight receiving apparatus, a valve to supply liquid to said hopper, an adjustable overbalancing weight to cause the initial closing of said valve and adapted to be lifted by the upward movement of the hopper when it is overbalanced by the weights at the other end of the scale beam, another weight adapted to be lifted by the upward movement of the hopper aforesaid before said valve can be opened, a dribble trip supported by said frame and adapted to take the downward pressure of said last mentioned weight off from the hopper when it is descending so that said valve will not be completely closed so that a dribble of fluid will continue to flow therefrom, and so that the downward movement of the said hopper will be arrested until sufficient fluid has dribbled thereinto to again overbalance the weighted opposite end of the scale beam so that the hopper will move downwardly again, means being provided whereby the continued downward movement of the hopper will cause the liquid therein to be discharged.

3. The combination in apparatus for weighing liquids of a frame, a scale beam supported by said frame between its ends and supporting at one end the weight receiving apparatus and at the other end hopper supporting frames, a shaft uniting said hopper supporting frames, a tiltable hopper supported by said shaft having its center of gravity located at one side of said shaft, means to lock said hopper in an upright position, means to unlock said hopper in its downward movement so that it can tilt and discharge its contents and a rod connected to the lower part of the hopper supporting frames substantially in the vertical line of their support upon the scale beam and pivoted at its opposite end in substantially the same vertical line as the scale beam to permit said hopper supporting frames to move up and down without tilting.

4. In automatic weighing apparatus, the combination of a tiltable hopper, balancing means permitting up and down balancing movements of said hopper, mechanism for automatically unlocking said hopper on downward movements thereof to permit it to tilt to discharge its contents, and manually operable means adapted to be engaged with the hopper to prevent its tilting on downward movements thereof when unlocked by said unlocking mechanism.

5. In apparatus for weighing liquids the combination with the weighing mechanism of a tiltable hopper provided with an overbalancing weight for tilting the hopper when empty to a vertical position, of means for locking the hopper in an upright position, means for unlocking the hopper so that it can discharge its contents, the said hopper being provided with a partition therein to form a chamber to retain liquid in the hopper to prevent the hopper from being tipped to its upright position and an adjustable cover to regulate the escape of the liquid from said chamber.

6. In apparatus for weighing liquids the combination with the weighing mechanism of a tiltable hopper provided with an overbalancing weight for tilting the hopper when empty to an upright position of means for locking the hopper in an upright position, means for unlocking the hopper so that it can discharge its contents, the said hopper being provided with partitions 105 and 107 therein to form liquid retaining chambers 106 and 108, partition 107 being provided with an aperture 109 to establish communication between chambers 106 and 108, a hinged cover 110 provided with adjusting means 111 for regulating the rate of escape of liquid from chamber 108 and the hopper being provided with aperture 112 to permit liquid in chamber 108 to escape therefrom as the hopper is tilted to its upright position.

In witness whereof I hereto affix my signature in presence of two witnesses.

HENRY WILLIAM WELSH.

Witnesses:
CHAS. L. GOSS,
FRANK E. DENNETT.

Copies of this patent may be obtained for five cents each, by addressing the "Commissioner of Patents, Washington, D. C."